United States Patent
Ichihara

(10) Patent No.: US 7,856,216 B2
(45) Date of Patent: Dec. 21, 2010

(54) DIVERSITY RECEIVER AND GAIN ADJUSTING METHOD THEREFOR

(75) Inventor: Masaki Ichihara, Minato-ku (JP)

(73) Assignee: NEC Corporation, Tokyo (JP)

( * ) Notice: Subject to any disclaimer, the term of this patent is extended or adjusted under 35 U.S.C. 154(b) by 675 days.

(21) Appl. No.: 11/817,110

(22) PCT Filed: Feb. 23, 2006

(86) PCT No.: PCT/JP2006/303249

§ 371 (c)(1),
(2), (4) Date: Aug. 24, 2007

(87) PCT Pub. No.: WO2006/093012

PCT Pub. Date: Sep. 8, 2006

(65) Prior Publication Data

US 2009/0011731 A1    Jan. 8, 2009

(30) Foreign Application Priority Data

Mar. 2, 2005    (JP) .............................. 2005-057480

(51) Int. Cl.
*H04B 17/02* (2006.01)
*H04K 3/00* (2006.01)

(52) U.S. Cl. .................. 455/134; 455/245.2; 455/247.1
(58) Field of Classification Search ................. 455/132, 455/134–136, 138, 234.1, 245.2–247.1; 375/345, 375/347

See application file for complete search history.

(56) References Cited

U.S. PATENT DOCUMENTS 7,373,126 B2 *   5/2008   Narita ..................... 455/234.1

FOREIGN PATENT DOCUMENTS

| JP | 9-247005 A | 9/1997 |
|---|---|---|
| JP | 2001-168780 A | 6/2001 |
| JP | 2002-141844 A | 5/2002 |

\* cited by examiner

*Primary Examiner*—Lee Nguyen
(74) *Attorney, Agent, or Firm*—Sughrue Mion, PLLC

(57) ABSTRACT

Reception levels are measured in respective branches to compare the results of the measurements with one another to select the result of the measurement of a maximum reception level which is the highest reception level. The gains of variable gain amplifiers (6, 7) of all the branches including variable gain amplifiers (6, 7) included in a branch corresponding to the maximum reception level are adjusted to the same value such that output levels of the variable gain amplifiers (6, 7) are set to a preset target level.

5 Claims, 5 Drawing Sheets

DIVERSITY RECEIVER AND GAIN ADJUSTING METHOD THEREFOR

TECHNICAL FIELD

The present invention relates to a diversity receiver and a gain adjusting method therefor which are suitable for application to a W-CDMA (Wideband Code Division Multiple Access) based radio communication system.

BACKGROUND ART

Referring to FIG. 1, a description will be first given of the configuration of a conventional receiver, used in a W-CDMA based radio communication system, which does not employ a diversity reception scheme. It should be noted that the receiver illustrated in FIG. 1 has a configuration which is predicated on a direct conversion scheme which directly converts a received radio frequency signal to a baseband signal. Direct conversion based receivers are described in detail, for example, in Japanese Patent No. 3329264, Japanese Patent No. 3479835, and the like.

As illustrated in FIG. 1, in the conventional receiver, a signal received by antenna 1 is amplified by LNA (low-noise amplifier) 2. The signal delivered from LNA 2 is converted to a baseband signal by orthogonal demodulator 4 after unwanted wave components which are the outside of a reception band have been removed by bandpass filter 3. Here, since the direct conversion scheme is assumed, local oscillator 5 generates a frequency which is the same as the carrier frequency of the received signal.

Orthogonal demodulator 4 delivers two baseband signals, i.e., an I-signal which is a component in phase with a local signal, and a Q-signal which is a component orthogonal to the local signal. The I-signal and Q-signal are amplified by variable gain amplifiers (VGA) 6, 7, and converted to digital signals by A/D converters 10, 11 after unwanted wave components which are the outside of a using channel have been removed by low pass filters 8, 9.

Generally, A/D converters 10, 11 used herein are of approximately eight bits taking into account the size of the circuit and operation speed. This results in approximately 50 dB of difference (dynamic range) between a maximal non-distortion input level available to A/D conversion and the quantization noise. Taking into consideration the peak factor of an input signal and the required S/N ratio, A/D converters 10, 11 cannot make use of their overall dynamic ranges. Therefore, the gains of variable gain amplifiers 6, 7 are adjusted such that the input levels to A/D converters 10, 11 present optimal values. Specifically, a target is set at a level approximately 10 dB lower than a maximal non-distortion input level which can be converted by A/D converters 10, 11 (called the "target level") to adjust the gains of variable gain amplifiers 6, 7.

The I-signal and Q-signal delivered from A/D converters 10, 11, after they have been converted to digital signals, are supplied to a demodulator circuit (Demodulator), not shown, to restore the original signal. Also, the I-signal and Q-signal delivered from A/D converters 10, 11 are supplied to reception level measuring unit (Level Calculation) 12 to calculate average reception level (power) P for each slot in accordance with the following Equation (1):

[Equation 1]

$$P = \frac{1}{M} \cdot \sum_{i=K+1}^{K+M} (I_i^2 + Q_i^2) \quad (1)$$

Suffixes to I, Q in Equation (1) designate sample numbers of the digitally converted I-signal and Q-signal, and K designates a preceding number of the slot. Also, M designates the number of samples in the slot, and K+1 designates a sample number at the beginning point of the slot. The "slot" refers to a unit time for operational processing determined by the W-CDMA scheme. In the W-CDMA scheme, the average reception level is calculated on a slot-by-slot basis, and the gains of variable gain amplifiers 6, 7 are controlled based on that the value.

Average reception level P calculated by reception level measuring unit 12 is supplied to gain setting circuit (Gain Setting) 13. Gain setting circuit (Gain Setting) 13 generates a control signal corresponding to the difference between average reception level P received from reception level measuring unit 12 and the target level to set the gains of variable gain amplifiers (VGA) 6, 7. Known configurations for variable gain amplifiers 6, 7 include changing the gains in response to an input voltage which is the control signal, or discretely controlling the gains in response to a digital signal which is the control signal, or the like. In this way, feedback control is conducted to optimize the input levels to A/D converters 10, 11.

The foregoing description has been given of the configuration of the conventional receiver, used in a W-CDMA based radio communication system and the like, which does not employ a diversity reception scheme.

Incidentally, radio frequencies currently used by W-CDMA based radio communication systems are in a 2-GHz band, and the propagation characteristics deteriorates in rooms and the like, as compared with a 800-MHz band which is used by PDC (Personal Digital Cellular) and other radio communication systems. Accordingly, for purposes of compensating for deteriorated reception performance in a low electric-field range, studies have been made on the employment of a diversity reception scheme in the W-CDMA based radio communication system as well.

In regard to a general diversity receiver, which is not based on use with a W-CDMA scheme, an exemplary configuration thereof is described, for example, in Japanese Patent Laid-Open No. 2002-141844A. Japanese Patent Laid-Open No. 2002-141844A describes a diversity receiver, for which the direct conversion scheme is not used, to measure the received power of each of two branches (receivers) by converting a radio frequency signal to an intermediate frequency signal and by detecting the envelope of the intermediate frequency signal.

When the diversity reception scheme is applied to the W-CDMA based radio communication system, problems as described below will arise if a diversity reception based receiver is designed as illustrated in FIG. 2 by simply using the conventional receiver illustrated in FIG. 1.

FIG. 2 illustrates the configuration of a diversity reception scheme having two branches (receivers) A, B, given as an example, in which the circuit illustrated in FIG. 1 is applied, as is, to branch A and branch B. However, only local oscillator 5 is shared by branches A, B. While each component in FIG. 2 is designated a similar reference numeral to that in FIG. 1, a suffix "a" is added to reference numerals in branch A, and a suffix "b" is added in branch B for distinguishing them from each other.

In such a configuration, the gains of variable gain amplifiers are adjusted independently in each of branches A, B. An adjusting method therefor is completely similar to that used for the circuit illustrated in FIG. 1. However, since branches A, B differ in average reception level, the gain of each variable gain amplifier is adjusted such that an input level to an A/D converter included in a branch to which the variable gain amplifier belongs is equal to the respective target level.

FIG. 3 shows output levels of the variable gain amplifiers in the respective branches in the configuration illustrated in FIG. 2 after the gain adjustment. In the graph of FIG. 3, the vertical axis is in units of decibel (dB). Also, assume herein that branch A has a lower average reception level than branch B. In such an event, since the gains of the variable gain amplifiers are adjusted independently in each of the branches as described above, the output level of each variable gain amplifier converges to the target level, as a result.

Assume herein that branch B has an S/N ratio (Sb/Nb) of 30 dB. Specifically,

[Equation 2]

$$\left[\frac{S_b}{N_b}\right] = 30 \, \text{dB} \qquad (2)$$

In this event, a noise level is equal at the reception input of each branch, and signal power Sa, Sb after the gain adjustment is:

$$Sa = Sb = \text{Target Level} \qquad (3)$$

Therefore, assuming that the average reception level of branch A is lower, for example, by 10 dB than the average reception level of branch B, the S/N ratio (Sa/Na) is calculated by:

[Equation 3]

$$\left[\frac{S_a}{N_a}\right]_{dB} = \left[\frac{S_b}{N_b}\right]_{dB} - 10 \, \text{dB} = 20 \, \text{dB} \qquad (4)$$

Accordingly, after gain adjustment, the noise level Na of branch A is 10 dB larger than the noise level Nb of branch B after gain adjustment, and presents ten times as much power when represented in true value.

As output signals from these two branches are combined in a circuit at a subsequent stage, not shown, the respective signals are added in phase with each other, so that total signal power S is calculated by:

[Equation 4]

$$S = (\sqrt{S_a} + \sqrt{S_b})^2 = 4 \times S_a = 4 \times S_b \qquad (5)$$

In regard to noise, since there is no correlation between branch A and branch B, total noise power N is the sum of the power of these branches. Specifically,

[Equation 5]

$$N = N_a + N_b = 10 \times N_b + N_b = 11 \times N_b \qquad (6)$$

Accordingly, the S/N ratio of the overall circuit illustrated in FIG. 2 is calculated by:

[Equation 6]

$$\left[\frac{S}{N}\right]_{dB} = \left[\frac{4}{11} \times \frac{S_b}{N_b}\right]_{dB} = \left[\frac{S_b}{N_b}\right]_{dB} - 4.4 \, \text{dB} \qquad (7)$$

The S/N ratio is deteriorated by 4.4 dB from the S/N ratio of the signal received only by branch B which presents a higher average reception level.

In this way, when two sets of circuits illustrated in FIG. 1 are provided, and the gains are adjusted independently on a branch-by-branch basis, the S/N ratio is lower than the ratio that results from a reception signal by only one branch output which presents a higher average reception signal. Another disadvantage is that the number of feedback loops for adjusting the gains is the same as number of branches which results in a complicated circuit configuration.

DISCLOSURE OF THE INVENTION

Accordingly, it is an object of the present invention to provide a diversity receiver which is capable of reducing deterioration in the S/N ratio in a simple circuit configuration, and to provide a gain adjusting method therefor.

To achieve the above object, in the present invention, reception levels are measured in respective branches to compare the results of the measurements with one another to select the result of the measurement having a maximum reception level which is the highest reception level. The gains of variable gain amplifiers of all the branches including variable gain amplifiers belonging to a branch corresponding to the maximum reception level are adjusted to the same value such that output levels of the variable gain amplifiers are set to a preset target level.

Thus, a diversity receiver and a gain adjusting method therefor of the present invention can restrain deterioration of the S/N ratio to produce effects resulting from the employment of the diversity reception scheme, as compared with the configuration illustrated in FIG. 2 which comprises two sets of circuits illustrated in FIG. 1 and which adjusts the gains independently on a branch-by-branch basis.

In addition, the circuit scale can be reduced because a feedback loop need not be included individually in each branch for gain adjustment.

BEST MODE FOR CARRYING OUT THE INVENTION

Figure 4:
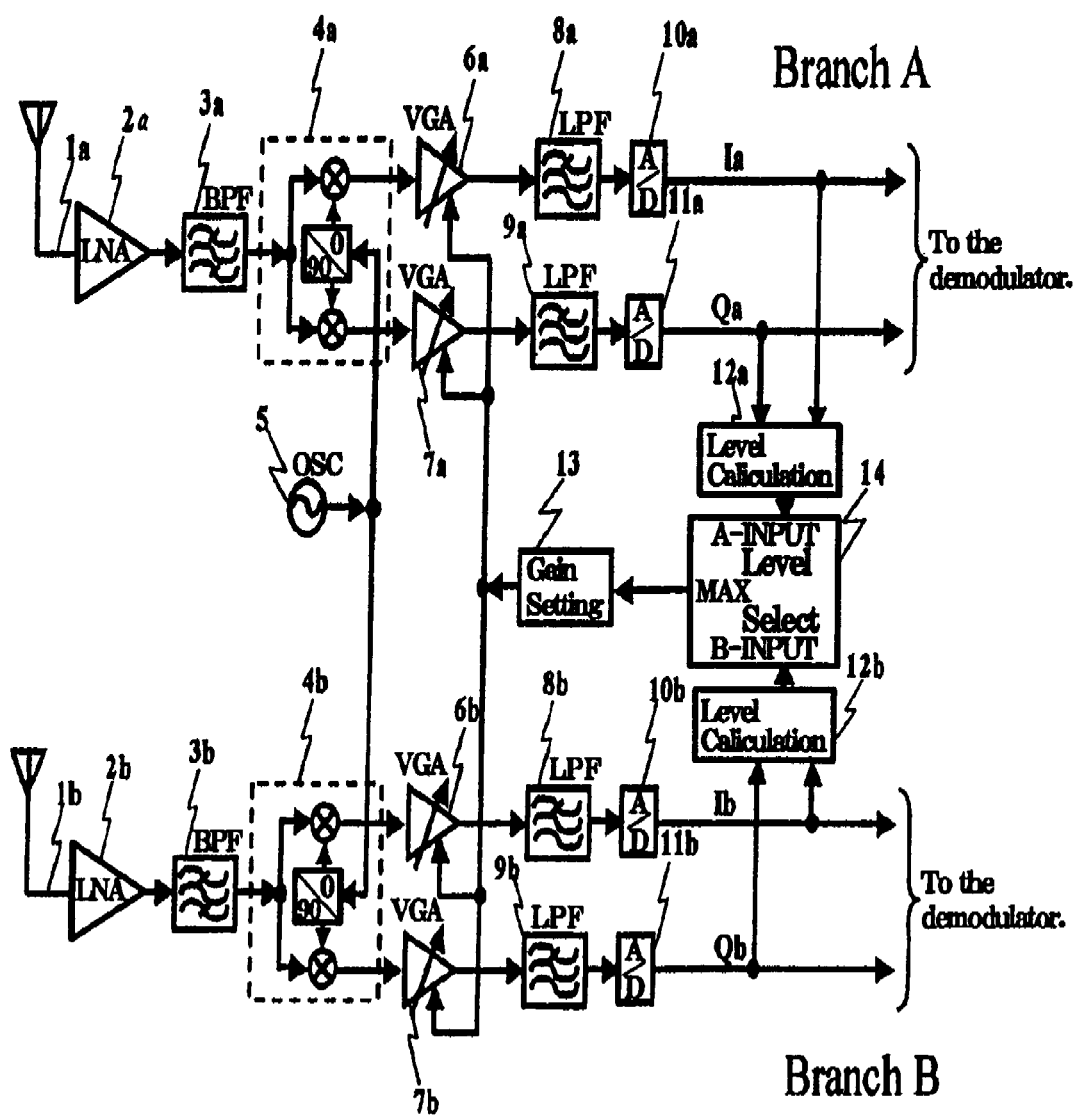
FIG. 4 is a block diagram illustrating an exemplary configuration of a diversity receiver according to the present invention.
Figure 5:
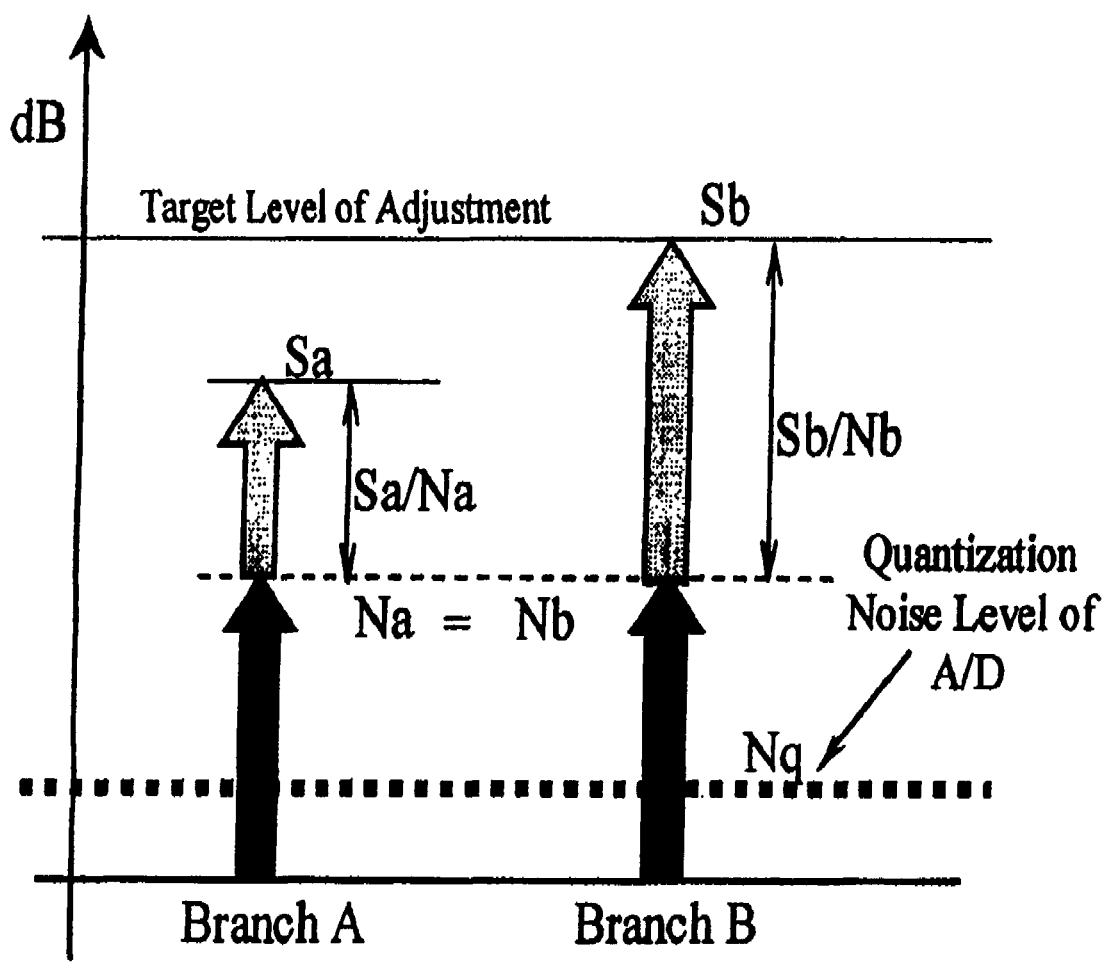
FIG. 5 is a graph showing an output level of each branch after a gain adjustment of the diversity receiver illustrated in FIG. 4.

FIG. 4 is a block diagram illustrating an exemplary configuration of a diversity receiver according to the present invention, and FIG. 5 is a graph showing the output level of each branch after a gain adjustment of the diversity receiver illustrated in FIG. 4. In FIG. 4, components similar to those in the conventional receiver illustrated in FIG. 2 are designated similar reference numerals to those in FIG. 2.

The diversity receiver of the present invention is suitable for application to a radio communication system having a wide dynamic range of reception levels, like a W-CDMA scheme, which is required to finely adjust the gains of receivers, in order to carry out optimal and stable receptions.

As illustrated in FIG. 4, the receiver of this embodiment is a diversity receiver which comprises branches (Branches) A, B, and local oscillator 5 and gain setting circuit 13 shared by branches A, B.

Figure 2:
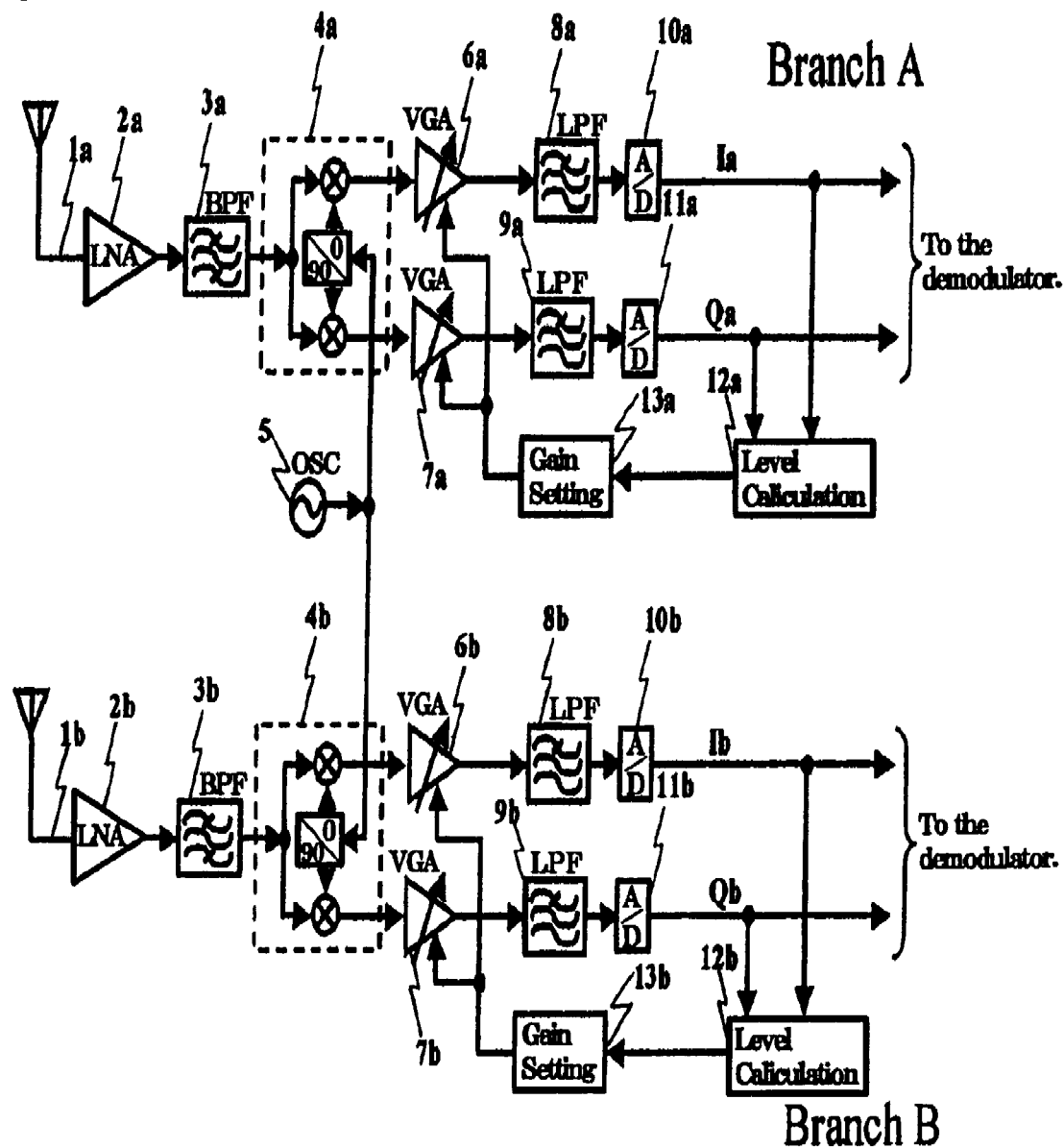
FIG. 2 is a block diagram illustrating an exemplary configuration of a diversity receiver which employs the receiver illustrated in FIG. 1 in each branch.
Figure 3:
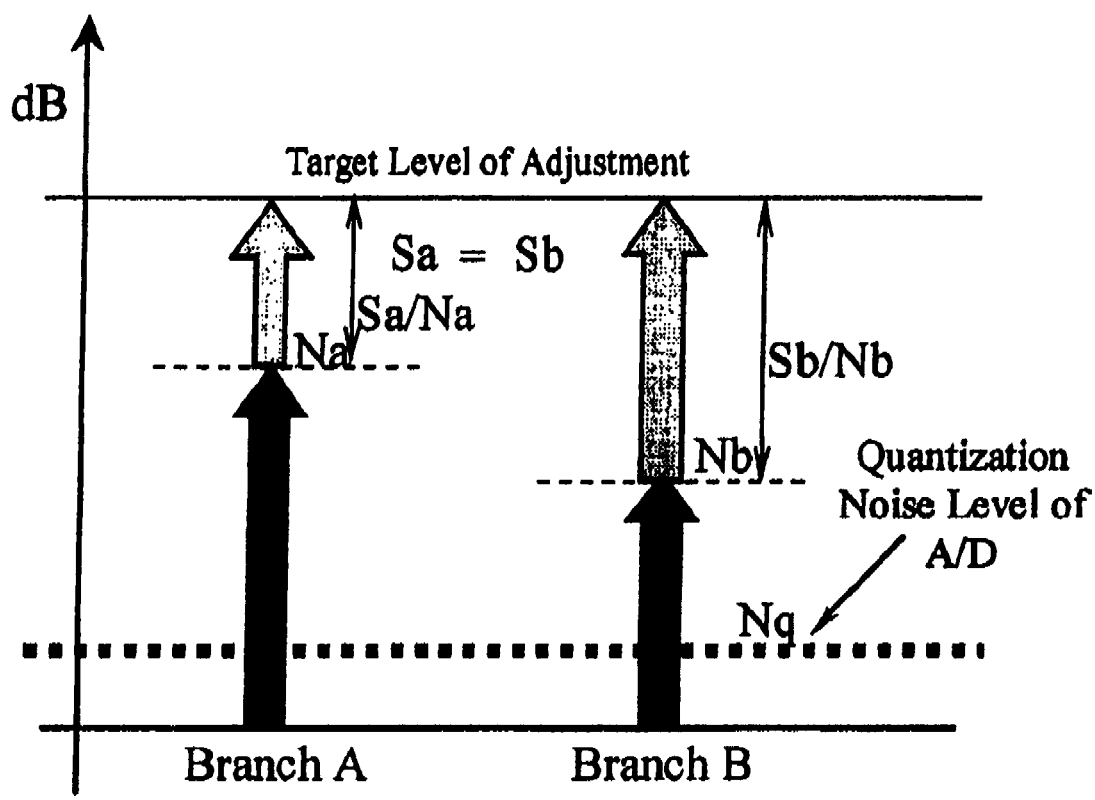
FIG. 3 is a graph showing an output level of each branch after a gain adjustment of the diversity receiver illustrated in FIG. 2.

The diversity receiver of this embodiment differs in configuration from that illustrated in FIG. 2 in that it comprises level selector circuit (Level select) 14 for receiving average received power P of each of branches (Branches) A, B to select the highest average reception level P (maximum reception level) which is supplied to gain setting circuit (Gain Setting) 13. In the diversity receiver of this embodiment, the gains of branches A, B are adjusted respectively in accordance with the maximum reception level selected by this level selector circuit (Level select) 14.

More specifically, the adjustment is made based on the results of calculations by reception level measuring units 12a, 12b such that the input level of an A/D converter included in the branch presenting a higher average reception level is set to a target level. In other words, the branch presenting a lower average reception level is also set to the same gain as the branch presenting higher average reception level P in accordance with an output signal from gain setting circuit (Gain setting) 13.

Accordingly, in the configuration of this embodiment, the difference in output signal level between the respective branches remains equal to the difference in level between signals received by the respective branches. In regard to the noise level, on the other hand, the respective branches present substantially the same level because the signals pass through branch A and branch B in the same configuration with an equal gain.

The graph of FIG. 5 shows output levels of respective variable gain amplifiers 6a, 6b, 7a, 7b of branches A, B after gain adjustment in the configuration illustrated in FIG. 4. In FIG. 5, the vertical axis is in units of decibel (dB).

Assume herein that branch A is lower than branch B in the received signal level.

Specifically, assume that:

S/N Ratio of Branch $B$:$S_b/N_b$=30 dB,

Level of branch A:Branch B−10 dB, and

S/N Ratio of Branch $A$:$S_a/N_a$=$S_b/N_b$−10 dB=20 dB

In this embodiment, the gain is adjusted such that the output level of branch B is set to a target level, as shown in FIG. 5.

In this event, since branches A, B are identical in gain and circuit configuration, noise power Na is equal to Nb.

[Equation 7]

$$N_a = N_b \tag{8}$$

On the other hand, signal power Sa of branch A and signal power Sb of branch B are calculated by:

[Equation 8]

$$S_a = 100 \times N_a = 100 \times N_b \tag{9}$$

[Equation 9]

$$S_b = 1000 \times N_b \tag{10}$$

They are combined in phase with each other to calculate total signal power S:

[Equation 10]

$$S = (\sqrt{S_a} + \sqrt{S_b})^2 = (\sqrt{100 \times N_b} + \sqrt{1000 \times N_b})^2 = 1732.4 \times N_b \tag{11}$$

Also, total noise power N is twice as much as noise power Nb because there is no correlation between the branches, and is therefore calculated by:

[Equation 11]

$$N = N_a + N_b = 2 \times N_b \tag{12}$$

From the foregoing, the S/N ratio of the overall circuit illustrated in FIG. 4 is calculated by:

[Equation 12]

$$\left[\frac{S}{N}\right]_{dB} = \left[\frac{1732.4 \times N_b}{2 \times N_b}\right]_{dB} = 29.4 \text{ dB} \tag{13}$$

Accordingly, the S/N ratio deteriorates by only approximately 0.6 dB from the signal received only in branch B which presents a higher average reception level.

While the diversity receiver of the present invention has been described above by giving, as an example, a configuration which comprises two branches (receivers), the number of branches is not limited to two, but may be equal to or larger than that. In this event, level selector circuit (Level select) 14 may receive average reception levels P of the respective branches calculated by a plurality of reception level measuring units (Level Calculation) to select and deliver the result of a measurement which presents the highest average reception level (maximum reception level) among them. In this event, gain setting circuit (Gain Setting) 13 sets all the variable gain amplifiers to the same gain based on the maximum reception level.

Figure 1:
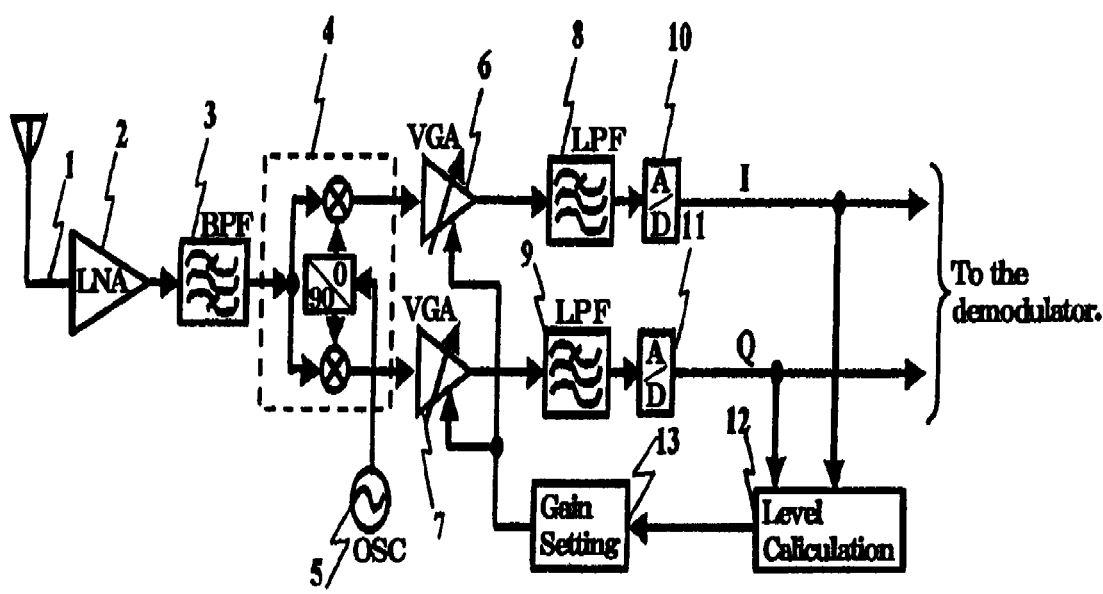
FIG. 1 is a block diagram illustrating the configuration of a conventional receiver which does not employ a diversity reception scheme.

According to the diversity receiver of this embodiment, the results of measurement of reception levels in respective branches are compared to select the result of a measurement indicative of a maximum reception level which is the highest reception level, and all variable gain amplifiers including variable gain amplifiers belonging to a branch corresponding to the maximum reception level are adjusted to the same gain such that the output levels of the variable gain amplifiers belonging to that branch are set to a preset target level. Consequently, deterioration in the S/N ratio is prevented, as compared with the configuration illustrated in FIG. 2 which comprises two sets of circuits illustrated in FIG. 1, and adjusts the gains independently on a branch-by-branch basis, thus producing the effect resulting from the employment of the diversity reception scheme. In addition, the circuit scale can be reduced because a feedback loop need not be included individually in each branch for gain adjustment.

In the W-CDMA based radio communication system, signal processing is performed on a slot-by-slot basis as described above. Accordingly, the gains of the variable gain amplifiers are also controlled based on the average received power value in each slot. Here, the gain is constant within one slot, and the previous processing result (average received power) is reflected in the next slot to set all the variable gain amplifiers to the same gain based on the maximum reception level. In other words, since a mobile terminal device comprising the diversity receiver of this embodiment comprises a storage element (slot), the processing result in the preceding slot can be utilized even if a communication is interrupted. For example, a variety of controls including the gain adjustment can be conducted with reference to the processing result in the preceding slot in a waiting state (intermittent reception) or when no packet is available.

In the configuration illustrated in FIG. 4, circuits such as a combiner circuit and a demodulator circuit (not shown) disposed at stages subsequent to A/D converters 10a, 10b, 11a, 11b, reception level measuring unit 12, level selector circuit 14 and the like can be contained in a single integrated circuit device. In this event, the integrated circuit is only required to deliver three signals, i.e., strobe, data, and clock to the outside (gain setting circuit 13).

On the other hand, in the configuration illustrated in FIG. 2, twice as many signals are delivered from an integrated circuit device to the outside (gain setting circuit 13). Recent mobile terminal devices experience significant difficulties as regards increasing the size of the mounting area. If the use of the diversity reception scheme results in a receiver having an increased number of components and consequently causes an increased in the number of terminals in the integrated circuit device which will require a larger mounting area, the integrated circuit device cannot be potentially mounted in the mobile terminal device. Thus, a reduction in circuit scale, as in the present invention, produces significant effects, if an increase in the number of terminals can be limited even to three.

The invention claimed is:

1. A diversity receiver including a plurality of branches each comprised of a direct conversion type receiver, said diversity receiver comprising:
   a plurality of variable gain amplifiers, the gains of which can be controlled, for amplifying a received signal of each of said branches;
   a plurality of reception level measuring circuits for measuring a reception level in each of said branches to deliver the result of the measurement;
   a reception level selector circuit for comparing the results of the measurements of the reception levels in the respective branches to select and deliver the result of the measurement of a maximum reception level which is the highest reception level; and
   a gain setting circuit for adjusting the variable gain amplifiers of all branches, including variable gain amplifiers belonging to a branch corresponding to the maximum reception level, to the same gain such that output levels of said variable gain amplifiers are set to a preset predetermined value, wherein:
   said reception level measuring circuit calculates average power of the reception levels on a slot-by-slot basis for each of said branches, said slot indicating a preset predetermined time interval, to deliver the calculated average power as the result of the measurement of the reception level, and
   said reception level selector circuit determines the maximum reception level for each of the slots by comparing the result of the measurement of the reception for all said branches during each of said slots, and sets all the variable gain amplifiers to the same gain based on the maximum reception level.

2. The diversity receiver according to claim 1, wherein said reception level measuring circuit and said reception level selector circuit are included in a single integrated circuit device.

3. The diversity receiver of claim 1, wherein the gain setting circuit adjusts the gain of each of the plurality of variable gain amplifiers during a slot based on a maximum reception level measured in a preceding slot.

4. The gain adjusting method of claim 1, wherein the variable gain amplifiers are set to the same gain based on the maximum reception level determined during a preceding slot.

5. A gain adjusting method for a diversity receiver which comprises a plurality of branches each including a direct conversion type receiver, said each branch comprising a plurality of variable gain amplifiers, the gains of which can be controlled, said method comprising:
   measuring a reception level for each of said branches to deliver the respective results of the measurements;
   comparing the measurement results of reception levels in said respective branches with one another to select the result of the measurement of a maximum reception level which is the highest reception level; and
   adjusting the variable gain amplifiers of all said branches, including variable gain amplifiers belonging to a branch corresponding to the maximum reception level, to the same gain such that output levels of said variable gain amplifiers are set to a preset predetermined value wherein:
   the measuring a reception level for each of said branches comprises calculating average power of the reception levels of each of said branches on a slot-by-slot basis, a slot indicating which is a preset time interval, and outputting the measured reception levels for each of said branches for each of said slots,
   the maximum reception level for each said slot is determined by comparing the output measured reception levels for each said branch during said slot, and
   all the variable gain amplifiers are set to the same gain based on the determined maximum reception level.

* * * * *